United States Patent
Bell, Jr. et al.

(10) Patent No.: US 9,727,469 B2
(45) Date of Patent: *Aug. 8, 2017

(54) PERFORMANCE-DRIVEN CACHE LINE MEMORY ACCESS

(71) Applicant: International Business Machines Corporation, Armonk, NY (US)

(72) Inventors: Robert H. Bell, Jr., Austin, TX (US); Men-Chow Chiang, Austin, TX (US); Hong L. Hua, Austin, TX (US); Mysore S. Srinivas, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 308 days.

This patent is subject to a terminal disclaimer.

(21) Appl. No.: 13/767,916

(22) Filed: Feb. 15, 2013

(65) Prior Publication Data

US 2014/0095796 A1    Apr. 3, 2014

Related U.S. Application Data

(63) Continuation of application No. 13/633,893, filed on Oct. 3, 2012.

(51) Int. Cl.
| | |
|---|---|
| *G06F 12/08* | (2016.01) |
| *G06F 12/084* | (2016.01) |
| *G06F 12/0855* | (2016.01) |
| *G06F 12/0886* | (2016.01) |
| *G06F 12/0897* | (2016.01) |

(52) U.S. Cl.
CPC ........ *G06F 12/084* (2013.01); *G06F 12/0855* (2013.01); *G06F 12/0886* (2013.01); *G06F 12/0897* (2013.01)

(58) Field of Classification Search
CPC ............... G06F 3/0659; G06F 12/0811; G06F 12/0897; G06F 13/1626; G06F 13/18
USPC ......................................... 711/122, 151, 158
See application file for complete search history.

(56) References Cited

U.S. PATENT DOCUMENTS

| | | | |
|---|---|---|---|
| 5,414,824 A | 5/1995 | Grochowski | |
| 5,692,152 A * | 11/1997 | Cohen et al. | ................. 711/140 |
| 5,875,464 A | 2/1999 | Kirk | |
| 6,397,296 B1 | 5/2002 | Werner | |
| 6,751,705 B1 | 6/2004 | Solomon et al. | |
| 6,848,035 B2 | 1/2005 | Akiyama et al. | |
| 6,862,225 B2 | 3/2005 | Zhang | |
| 7,219,185 B2 | 5/2007 | Luick | |
| 2002/0095684 A1* | 7/2002 | St. John | .............. H04L 12/2801 |
| | | | 725/95 |

(Continued)

*Primary Examiner* — Reginald Bragdon
*Assistant Examiner* — Mehdi Namazi
(74) *Attorney, Agent, or Firm* — James L. Baudino

(57) ABSTRACT

According to one aspect of the present disclosure, a method and technique for performance-driven cache line memory access is disclosed. The method includes: receiving, by a memory controller of a data processing system, a request for a cache line; dividing the request into a plurality of cache subline requests, wherein at least one of the cache subline requests comprises a high priority data request and at least one of the cache subline requests comprises a low priority data request; servicing the high priority data request; and delaying servicing of the low priority data request until a low priority condition has been satisfied.

6 Claims, 7 Drawing Sheets

(56) References Cited

U.S. PATENT DOCUMENTS

| | | | |
|---|---|---|---|
| 2003/0198238 A1* | 10/2003 | Westby | 370/402 |
| 2007/0022239 A1* | 1/2007 | Gaskins | 710/305 |
| 2008/0010415 A1* | 1/2008 | Sawdey et al. | 711/136 |
| 2008/0052466 A1 | 2/2008 | Zulauf | |
| 2010/0228922 A1* | 9/2010 | Limaye | 711/135 |
| 2011/0131385 A1* | 6/2011 | Henriksson et al. | 711/158 |
| 2012/0072674 A1* | 3/2012 | Pierson et al. | 711/137 |
| 2012/0096225 A1 | 4/2012 | Khawand et al. | |
| 2013/0111135 A1* | 5/2013 | Bell et al. | 711/122 |
| 2013/0111136 A1* | 5/2013 | Bell et al. | 711/122 |
| 2013/0155923 A1* | 6/2013 | Yi et al. | 370/310 |
| 2013/0339626 A1* | 12/2013 | Alexander et al. | 711/143 |

* cited by examiner

PERFORMANCE-DRIVEN CACHE LINE MEMORY ACCESS

BACKGROUND

Computer or data processing systems utilize various methods to increase the speed of data processing. One such technique is the utilization of a memory hierarchy design. For example, computer memory systems often include different levels of memory such as a fast cache memory structure along with a slower main memory. If a request for data is found in a cache memory structure (a cache "hit"), the time penalty associated with retrieving the requested data from main system memory is avoided. However, cache space is a valuable commodity. For example, the larger the cache memory size, the more real estate of the chip the cache requires as well as increased power demand.

BRIEF SUMMARY

According to one aspect of the present disclosure a method and technique for performance-driven cache line memory access is disclosed. The method includes: receiving, by a memory controller of a data processing system, a request for a cache line; dividing the request into a plurality of cache subline requests, wherein at least one of the cache subline requests comprises a high priority data request and at least one of the cache subline requests comprises a low priority data request; servicing the high priority data request; and delaying servicing of the low priority data request until a low priority condition has been satisfied.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
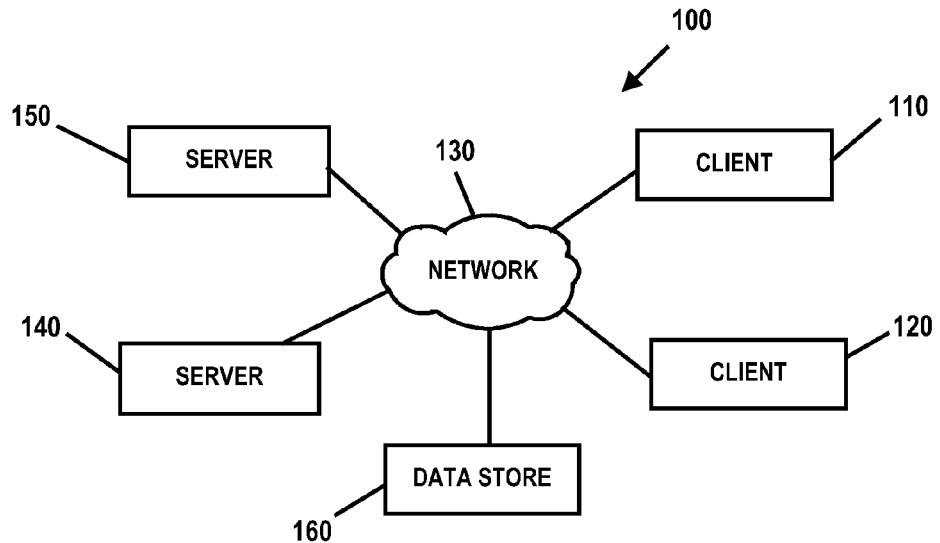
FIG. 1 is an embodiment of a network of data processing systems in which the illustrative embodiments of the present disclosure may be implemented.

Embodiments of the present disclosure provide a method, system and computer program product for performance-driven cache line memory access. For example, in some embodiments, the method and technique includes: receiving, by a memory controller of a data processing system, a request for a cache line; dividing the request into a plurality of cache subline requests, wherein at least one of the cache subline requests comprises a high priority data request and at least one of the cache subline requests comprises a low priority data request; servicing the high priority data request; and delaying servicing of the low priority data request until a low priority condition has been satisfied. Thus, in some embodiments of the present disclosure, a request for a cache line from memory resulting from a miss in a cache hierarchy is processed by dividing the cache line into a plurality of cache sublines where a cache subline corresponding to critical or high priority data is retrieved rapidly while the cache subline corresponding to non-critical or low priority data is held in a queue and serviced at a later time based on, for example, bandwidth availability, the expiration of a timer, or other criteria.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
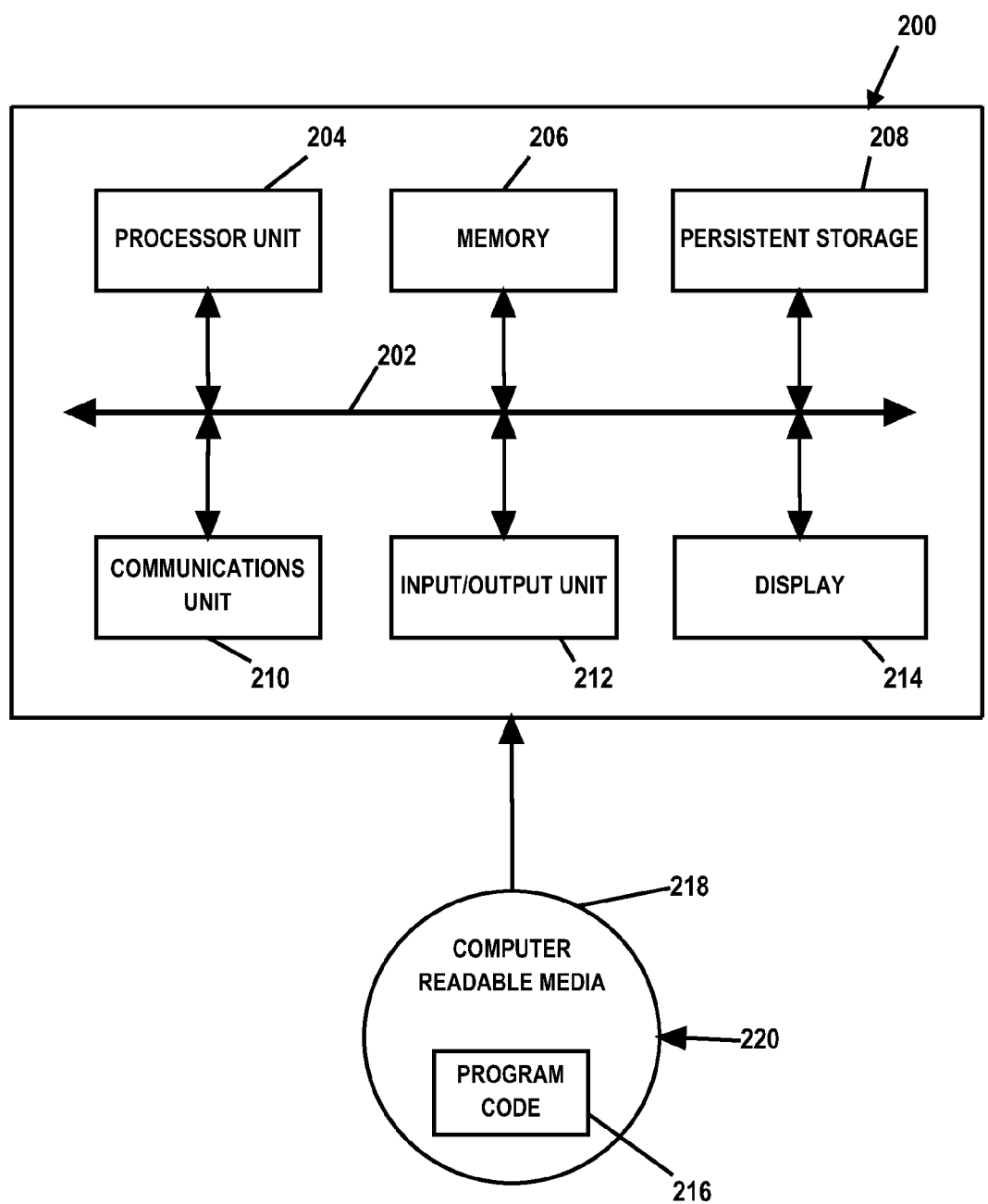
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a performance-driven cache line memory access system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
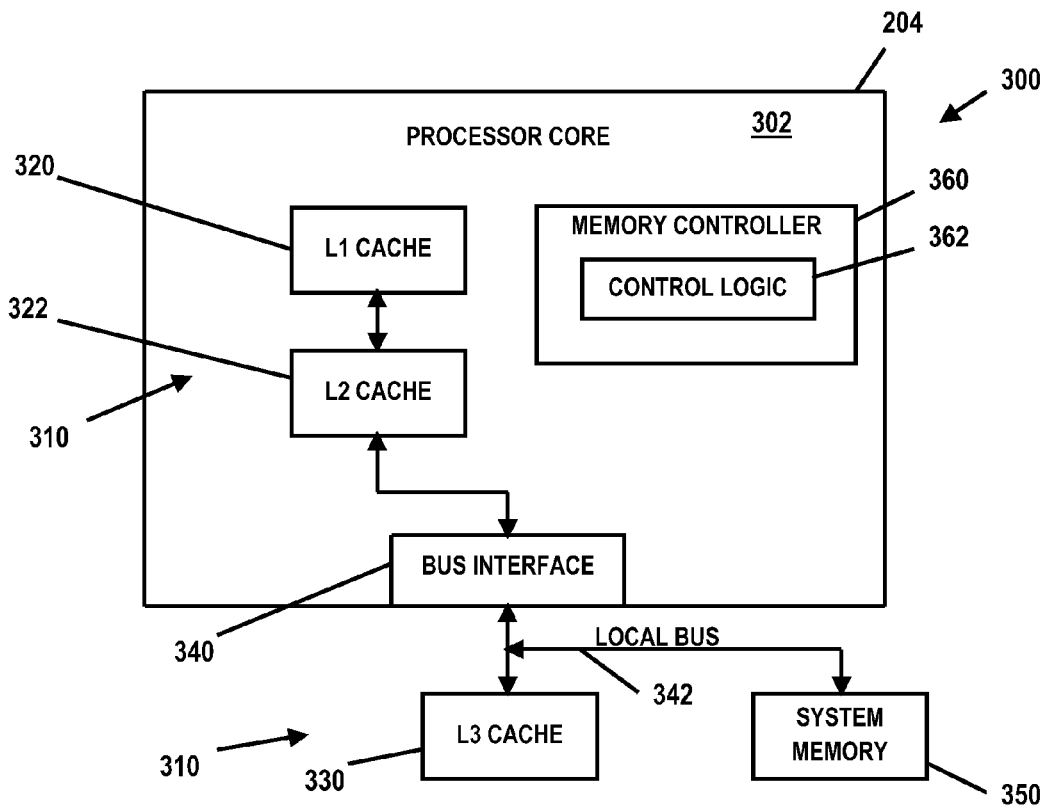
FIG. 3 is a diagram illustrating an embodiment of a data processing system for performance-driven cache line memory access in which illustrative embodiments of the present disclosure may be implemented.

FIG. 3 is an illustrative embodiment of a system 300 for performance-driven cache line memory access. System 300 may be implemented on data processing systems or platforms such as, but not limited to, servers 140 and/or 150, clients 110 and/or 120, or at other data processing system locations. For example, in the embodiment illustrated in FIG. 3, system 300 comprises processor unit 204 having one or more instances of a processor core 302 and a cache hierarchy 310 coupled to processor core 302. It should be understood that processor core 302 may include other units not illustrated in FIG. 3 such as, but not limited to, a prefetch unit, arithmetic logic units, etc. In the illustrated embodiment, cache hierarchy 310 includes a level one (L1) cache 320 and a level two (L2) cache 322 in processor core 302, and a level three (L3) cache 330. The quantity and location of the various levels of cache of cache hierarchy 310, as well as the quantity of cache structures at a particular level, may vary (e.g., a single cache level within core 302 with multiple cache levels outside core 302, etc.). As used herein an "upper level" cache and a "lower level" cache corresponds to the cache position in the hierarchy. For example, in the embodiment illustrated in FIG. 3, L1 cache 320 is an upper level cache to lower level L2 cache 322, and L2 cache 322 is an upper level cache to lower level L3 cache 330.

L1 cache 320 is used to store data that is operated on by processor unit 204. L1 cache 320 is coupled to L2 cache 322. Requests for data cause read requests to L1 cache 320. If data is not present in L1 cache 320 (a cache miss), a read request will be issued to L2 cache 322. Likewise, if the data is not present in L2 cache 322, a read request will be issued through bus interface 340 and carried on a local bus 342 to L3 cache 330. Similarly, if data is not present in L3 cache 330, a read request will be issued to a system memory 350.

When a read request is satisfied, a storage location in a cache is selected to store the read data. In some instances, all of the cache entries of a particular cache structure may be in use or are full. Typically, when a cache becomes full, a cache line is removed ("evicted") and written or stored to a lower level cache or to system memory 350. Similarly, if a read request is satisfied from a lower level cache, the read data may be written to or stored in an upper level cache. In FIG. 3, processor core 302 includes a memory controller 360 that may control read and write access to one of more system 300 memories, such as cache hierarchy 310 and system memory 350. For ease of illustration and description, memory controller 360 is illustrated as part of processor core 302; however, memory controller 360 may comprise a distributed memory control architecture (e.g., logic and/or state machines distributed and/or otherwise associated with different memory components, such as control logic associated with each level of cache hierarchy). Memory controller 360 may be implemented in any suitable manner using known techniques that may be hardware-based, software-based, or some combination of both. For example, memory controller 360 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). In the embodiment illustrated in FIG. 3, memory controller 360 includes control logic 362 for performing various functions and/or operations corresponding to cache hierarchy 310 and/or memory 350. For example, as will be described in further detail below, control logic 362 may divide data and/or cache line requests into different classes of requests, control the processing of data fetch and queuing operations associated with the different classes of cache line requests, and determine if and/or when to fetch certain classes of cache line requests.

Figure 4:
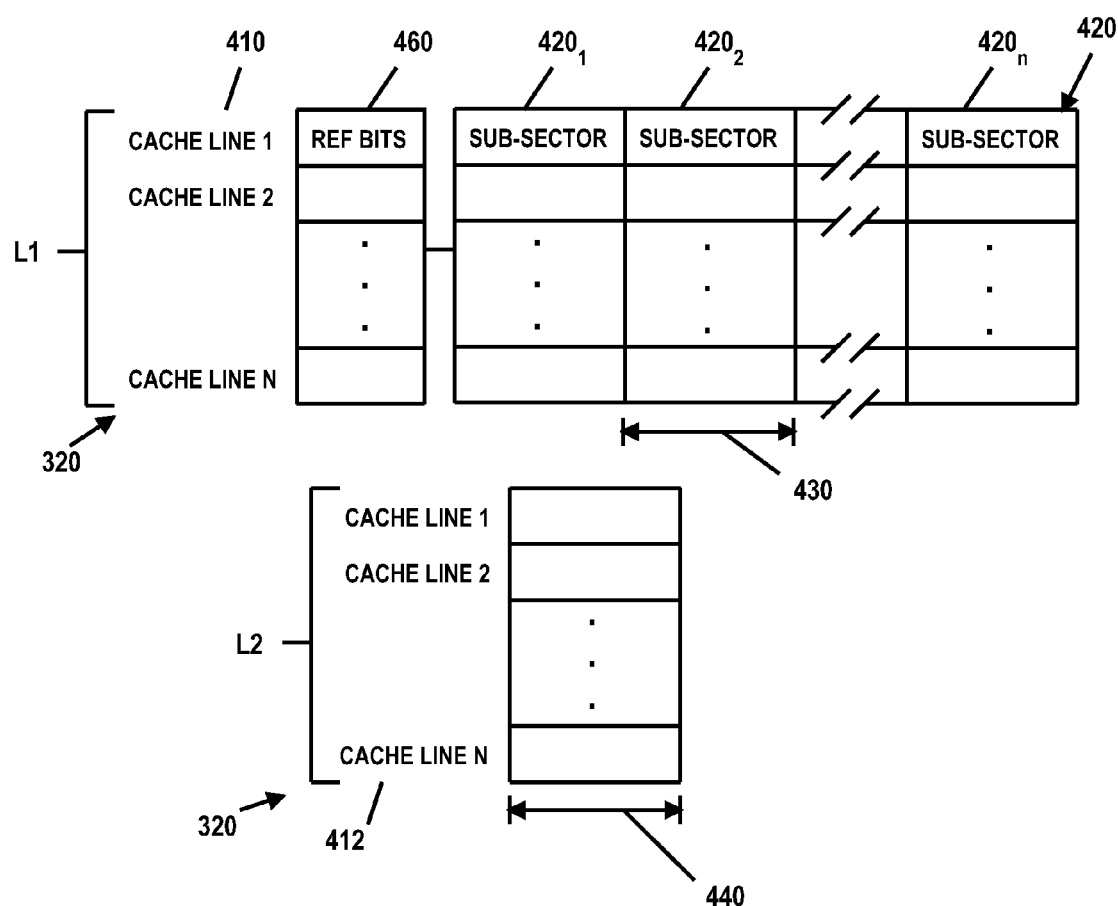
FIG. 4 is a diagram illustrating a cache hierarchy for performance-driven cache line memory access in which illustrative embodiments of the present disclosure may be implemented.

FIG. 4 is a diagram illustrating a portion of cache hierarchy 310 illustrated in FIG. 3. In FIG. 4, L1 cache 320 and L2 cache 322 are illustrated; however, it should be understood that embodiments of the present disclosure may be applied to other levels of a cache hierarchy. In the illustrated embodiment, L1 cache 320 and L2 cache 322 will be described using an exclusive implementation (i.e., that given data is not held concurrently by different cache levels); however, it should be understood that embodiments of the present disclosure may be implements in a nonexclusive caching system. In FIG. 4, L1 cache 320 will be referred to as the upper level cache, and L2 cache 322 will be referred to as the lower level cache. As illustrated in FIG. 4, caches 320 and 322 each include a number of entries or cache lines 410 and 412, respectively. Each cache line 410 and 412 may be indexed by a respective address.

In the embodiment illustrated in FIG. 4, upper level L1 cache 320 comprises a sectored cache while lower level L2 cache 322 comprises an unsectored cache. For example, in FIG. 4, each cache line 410 of upper level L1 cache 320 includes a plurality of line sub-units, sub-lines or sectors 420 (e.g., $420_{1-n}$). The cache lines 412 of lower level L2 cache 322 are unsectored. In some embodiments, each sub-sector 420 of a cache line 410 of the upper level cache 320 is sized to correspond to a size of the cache line 412 of lower level L2 cache 322. It should be understood that in some embodiments, each sector 420 of an upper level cache may be sized smaller than a cache line size of the lower level cache; however, in such embodiments, two or more of such sectors 420 would preferably be sized as a factor of the lower level cache line (i.e., the cache line size of the lower level cache being a multiple of the upper level cache line sector size). Thus, in the illustrative example of FIG. 4, a cache line 410 sector 420 size represented by reference number 430 would be equal to a cache line 412 size of the lower level cache 322, represented by reference number 440. For example, if a cache line size of lower level L2 cache is 64 bytes, upper level L1 cache 320 may be configured with a 128 byte cache line size with two sectors 420 each with a 64 byte line size. It should also be understood that in some embodiments, certain lower level caches may also be sectored.

A data processing system generally maintains a single cache line size throughout the cache hierarchy of the system, and if a system does contain a sectored cache, it is a lower level cache that is sectored and each sector is the same size as a cache line contained in the upper level cache. Sectoring reduces cache directory size for a larger cache, which in turn reduces the silicon cost and the logic complexity of processor systems that are designed to execute workloads that fetch data sequentially, efficiently utilizing a large proportion of the data in the contiguous sectors. As an example, systems with 128 byte cache lines in the upper level L1 cache may be designed with a lower level L2 cache that stores two consecutive cache lines, each of 128 bytes, in each cache location that is managed by a directory entry. Bits in the directory entry give the state of each sector that the directory entry manages. For workloads that exhibit good spatial locality and typically access more than 128 bytes contiguously, system performance can be improved by fetching the full 128 byte cache line into the upper level cache and by fetching or prefetching additional 128 byte sectors into the lower level cache in anticipation of their future use by the workload. However, in the upper level cache that is closest to the processing units, sectoring by doubling up the cache lines would increase the size and complexity of the cache and slow down accesses to the cache.

In contrast, many other types of workloads only use some bytes of a cache line of a particular size. As an example, if the processor cache line size is 128 bytes, a workload may only use 64 bytes or less of any particular cache line that is fetched from memory into the cache hierarchy (unless in a streaming or other type of process). This is typical for workloads that exhibit poor spatial locality or more random data accesses. For this type of workload, by partitioning the lower level cache into 64 byte cache lines instead of 128 byte cache lines and by carrying only referenced data, a higher proportion of the data that is cast out from the upper level cache to the lower level cache will be previously referenced data and is more likely to be referenced again by the upper level cache. Since the lower level cache, such as a 32 megabyte L3 cache, is typically orders of magnitude larger than an upper level cache, such as a 32 kilobyte L1 cache, a larger proportion of the data stored in the cache hierarchy becomes referenced data, as measured over the entire capacity of the cache hierarchy; the cache hierarchy then appears to be effectively larger than with an unsectored lower level cache since more of the data that has been stored is useful data. However, any performance increase comes at the cost of a larger directory and additional logic complexity in the lower level cache. In the case where the lower level cache is unsectored and maintains a cache line size that is less than the processor cache line size of an upper level cache, the cache lines in the upper level cache need to be treated as sectored in order to support the return of data for one or more cache sectors from the lower level cache.

Embodiments of the present disclosure enable the analysis of and, if needed, the dividing of a data and/or cache line request into different classes of requests and the processing of each of the different classes of requests according to a prioritized method. For example, in some embodiments of the present disclosure, a cache line request is divided to enable fetching of cache sub-lines from memory that contain the requested or critical data while other sub-lines or sectors of the cache line are fetched if bandwidth supports doing so or if the other cache sub-lines are requested. For example, in a 128-byte cache line machine, the caches may be sectored at 64 bytes or some other desired size. A 128-byte cache line request received by memory controller 360 (i.e., a miss in the cache hierarchy) is divided into two 64-byte requests. The particular 64-byte request that contains the requested data or critical word (e.g., requested by the core 302) is labeled and/or classified as a critical or high priority request, and the remaining 64-byte request is labeled and/or classified as a low-priority request. The high-priority requests are satisfied before any lower priority requests are satisfied. For example, the high-priority 64-byte request is fetched from memory 350 and forwarded to the cache hierarchy 310 and core 302 as rapidly as possible. If the fetched data is stored to a cache, only the portion of the cache line containing the critical fetched data is indicated as valid, and any old data that is valid on the old cache line, either a whole cache line or a single valid portion of the cache line, is either invalidated if it has not been modified or is cast out to a lower level cache (or memory 350) if it has been modified. Logic 362 and/or a state machine, for example, associated with a particular cache level may manage these operations.

Figure 5:
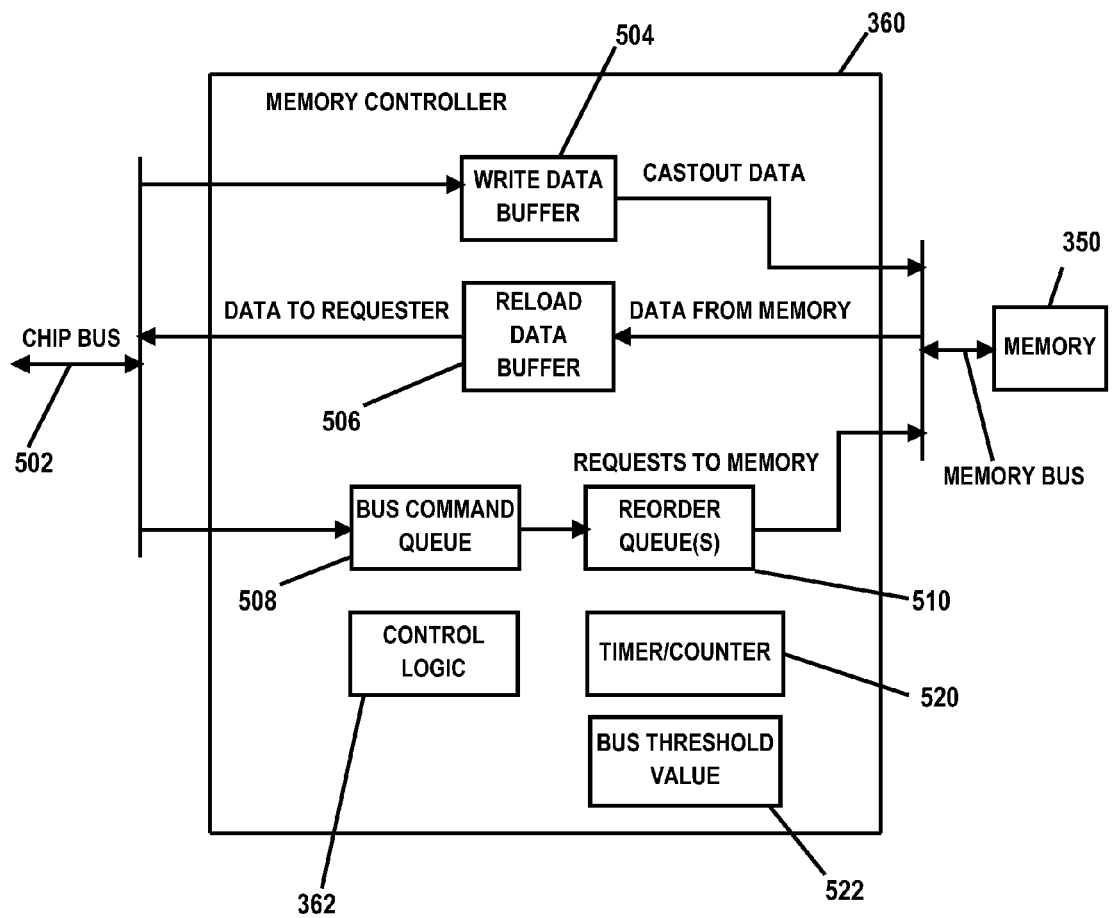
FIG. 5 is a diagram illustrating a memory controller for performance-driven cache line memory access in which illustrative embodiments of the present disclosure may be implemented.

FIG. 5 is a diagram illustrating an exemplary embodiment of memory controller 360. In the illustrated embodiment, data load and castout requests enter and/or are received by memory controller 360 from a chip bus interface 502. Memory controller 360 includes control logic 362, a write data buffer 504, a reload data buffer 506, a bus command queue(s) 508, and a reorder queue(s) 510. The data load and castout requests enter bus command queue 508, which detects and processes duplicate address requests. Reorder queue 510 processes the data and castout requests at the memory 350 interface. Castout data is held in write data buffer 504 until it can be sent to memory 350. Load data is held in reload data buffer 506 until it can be sent to the bus master on the chip bus interface 502. In the case of push operations for low-priority sectors or cache sub-lines, memory 350 acts as the bus master, requesting an upper level cache to receive data, and reload data is sent on the chip bus interface 502 after a responding cache initiates a state machine to receive the data into the cache. Reorder queues 510 may include queues for high priority requests and queues for low priority requests. Similarly, bus command queue(s) 508 may include queues for high priority requests and queues for low priority requests. Since one or more prioritized sub-sectors of a line may be returned from memory 350, the total size of the reload data buffer 506 to hold the returned data need not be re-sized except for perhaps additional valid and control bits.

In some embodiments, the low-priority data and/or cache line request may be fetched at some time later than the high-priority data based on certain criteria, but not necessarily back-to-back with the high-priority sector (i.e., the requests are loosely coupled). For example, in the reorder queues 510 in the memory controller 360, the high-priority requests are serviced first and the data is forwarded to the cache hierarchy 310, which is at least partially organized as sectored caches, and to core 302. The low-priority requests remain in the command queue 508 and reorder queues 510 and may be fetched as conditions permit. Thus, bandwidth on the memory 350 interface/bus 342 is used for critical word requests and for non-critical sectors when convenient, thereby improving performance for systems that have limited bandwidth per core.

Thus, for example, as described above, the data of the high-priority request is fetched from memory 350 and forwarded to the cache hierarchy 310 and core 302. If the high-priority request data is put into a cache (e.g., L1 cache 320), only that portion of the cache line is indicated as valid, and any old data that is valid in the old cache line, either a whole line or a single valid portion of the line, is either invalidated if it has not been modified or is cast out to a lower level cache or memory 350 if it has been modified. A state machine (e.g., logic 362 associated with L2 cache 322 or L3 cache 330) may manage these operations. The state machine of the cache hierarchy 310 returns the critical data to the core 302, then the state machine may exit and stop protecting the address after a predetermined window of time, whereupon the low-priority sector address enters or is already present in the memory controller 360 command queue 508, which then protects the address of the low-priority sector. If a core 302 request for the low-priority sector is subsequently received, a new state machine initiates, becomes the bus master, and protects operations on the low-priority sector address. The request is then sent to the memory controller 360, hits the low-priority request in the command queue 508, merges with the request already present in the memory controller 360, and causes the data to be fetched (if it has not been already) from the reorder queue 510 to the cache hierarchy 310 and core 302.

In some embodiments, a cache controller state machine may enter a "sequential prefetch" mode based on sequential workload behavior. In this mode, the state machine may serially request all sectors in the cache and handle placing the sectors in the cache back-to-back (e.g., to enable optimum performance for code with prefetching behaviors that have been predicted to be sequential by a prefetch engine). If one of the low-priority sector retrieval criteria causes the sub-line to be fetched internally to the memory controller 360 (e.g., on its own without a request from the core 302 or a bus master), then the data is obtained from memory 350 and held normally in the reload buffer 506. In some embodiments, a signal and sector address are then sent to the upper level cache, which initiates a new cache controller state machine, which then protects the sub-line and requests the data from the memory controller 360 and stores it to the cache. In turn, the data may be pushed to the L1 cache 320 in readiness for core 302 operations. Thus, the low-priority sector data may be "pushed" up into the cache hierarchy 310 and be ready for use.

In some embodiments, the data obtained internally may remain in the reload buffer 506 until a new request needs the buffer space or a bus master requests the sector. In this embodiment, the low-priority sector fetch may be similar to speculative data fetch operation in the memory controller 360. Thus, embodiments of the present disclosure are configured to program the time to delay low-priority sector fetches such that critical words are available in the core 302 for consumption, but all sectors in a cache line may eventually be available in the core 302 when needed. Fetching all sectors in a cache line to the core 302 may be a priority, but since the requests are "loosely coupled," the time between critical and non-critical sectors getting to the core 302 may vary.

According to the present disclosure, the low-priority sector request may not be immediately fetched. For example, when a low-priority sector request enters the reorder queue 510, a timer or counter 520 associated with the queue entry may be reset to a programmable timeout value and initiate a decrementing or countdown sequence. The low-priority sector request may remain in the reorder queue 510 for one of several possible conditions to be met before fetching (or not fetching) the data from memory 350. For example, in some embodiments, the low-priority sector request may remain in the reorder queue 510 while any other high-priority or critical sector requests in the memory controller 360 are first processed. If memory bus 342 utilization drops below a bus threshold value 522 (i.e., bus 342 is relatively unused), there should be sufficient bandwidth on the bus 342 to service both high and low priority data requests without impact to performance. Thus, in some embodiments, logic 362 may monitor the utilization of bus 342 and fetch the data for the low-priority requests if the utilization drops below threshold value 522.

The low-priority sector request may also remain in the reorder queue 510 until the timer/counter 520 reaches zero and/or otherwise reaches a limit (i.e., timing out). Upon the expiration or timing out of the timer/counter 520, if the low-priority request has not been cancelled, invalidated or had its data overwritten, the low-priority request is serviced (e.g., the command proceeds to memory 350 and returns the low-priority sector data to the core 302 and cache hierarchy 310). Additionally, if the core 302 cancels the low-priority request, the low-priority request data is not fetched (e.g., as a result of speculative or prefetch reads that the core 302 determines are not needed). The high-priority sector already in the core 302 or cache hierarchy 310 is invalidated or written to memory 350 if it has been modified. In most cases for speculative requests, the critical sectors can be invalidated. By invalidating cancelled requests, the cache hierarchy 310 leaves open slots for more useful data, and bandwidth on the memory interface/bus 342 for low-priority sectors is not consumed, leaving additional bandwidth for use by critical sectors.

The low-priority sector request may also remain in the reorder queue 510 until the cache hierarchy 310 invalidates the data for unmodified requests (i.e., the data is not fetched). This can happen if the data in a cache is replaced by some other request and the data has not been modified.

In this case, the sector is invalidated in the cache (or overwritten) and the outstanding low-priority sector request is deleted in the reorder queue 510. The low-priority sector request may also remain in the reorder queue 510 until the cache hierarchy 310 casts out a modified critical sector to make room for a more useful request. In this case, the modified sector is written to memory 350, and the low-priority request in the reorder queue is deleted.

Further, the low-priority sector request may remain in the reorder queue 510 until a new request for a critical word in the low-priority cache line enters the memory controller 360, at which time the low-priority request is transformed to a high-priority request, and data may be fetched. The request may be for a read or write. In the case of a write that is not a full-sector write, the new critical sector is read from memory 350, moved to a data buffer, and modified with the new data. If the write is for the full sector, the data can be written to the cache and the outstanding sector read is deleted without going to memory 350.

Figure 6:
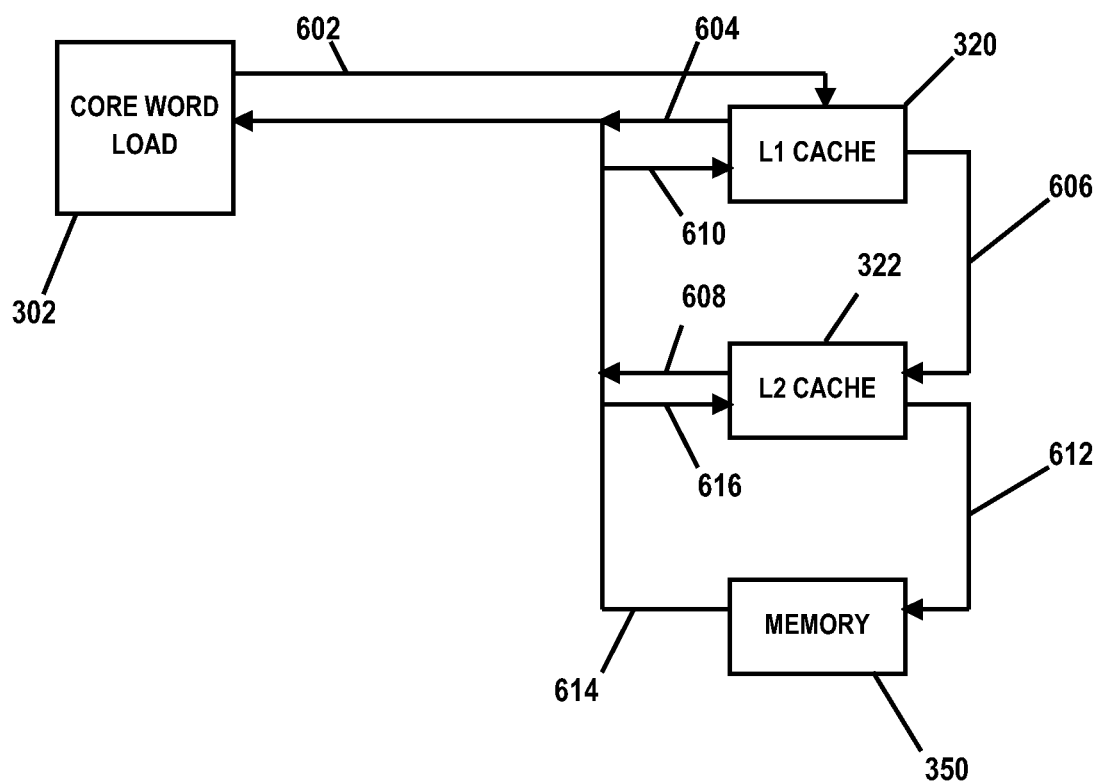
FIG. 6 is a diagram illustrating a technique for performance-driven cache line memory access relative to a cache hierarchy and a memory in which illustrative embodiments of the present disclosure may be implemented.

FIG. 6 is diagram illustrating a technique for performance-driven cache line memory access. In FIG. 6, only two levels of cache are illustrated (e.g., L1 cache 320 and L2 cache 322); however, it should be understood that the described technique may include additional and/or other cache levels. In the illustrated embodiment, core 302 requests, for example, an 8-byte load, represented by reference number 602. If the critical sector (i.e., containing the 8-byte load) is in L1 cache 320, L1 cache 320 returns the 8-byte data to core 302, represented by reference number 604. If any sector is not in the L1 cache 320, logic 362 or a state machine associated with L1 cache 320 requests a 128-byte line from the L2 cache 322, represented by reference number 606, structured as a sector request vector (SRV) and a sector priority vector (SPV) (e.g., for two 64-byte sectors, SRV={1,1} if both sectors 0 and 1 are not in the L1 cache 320, and SPV={1,0} if sector 0 is critical, and 1 is not). Similarly, if the critical sector is in the L2 cache 322, logic 362 or a state machine associated with the L2 cache 322 returns the data to the core 302, represented by reference number 608, but also any requested sectors to the L1 cache 320, represented by reference number 610. If any sector is not in the L2 cache 322, logic 362 or a state machine associated with the L2 cache 322 sends an SRV and SPV to memory 350, represented by reference number 612. Memory 350 returns the critical data to the core 302, represented by reference number 614, and any requested sectors to the L1 cache 320 (reference number 610) and L2 cache, represented by reference number 616. If only non-critical sectors are being returned from any cache level, the requestor need not wait, and data is "pushed" up the cache hierarchy 310 using a push request protocol as described earlier, with memory 350 acting as a bus master in this case. Coherency processes are performed for critical sectors (e.g., if the L2 cache 322 has a machine waiting on a request, the L2 cache 322 holds off the other requestor until the L2 cache 322 completes operations). If a remote core 302 requests a critical sector SRV (i.e., a coherency intervention) and only partial data is available in the L2 cache 322, the L2 cache 322 sends any sectors it has, informs memory 350 of the request, invalidates its sector entries, and memory 350 provides the remaining sectors to the requestor based on the SRV contents. If only memory controller 360 is working on the address (i.e., it is acting as the master) when the remote request occurs, memory controller 360 cancels any prior outstanding operations on the sectors and returns the requested SRV sectors to the remote requestor. If memory controller 360 is in the middle of an operation and cannot cancel the operation, memory controller 360 retries the remote request until the operation is completed.

Figure 7:
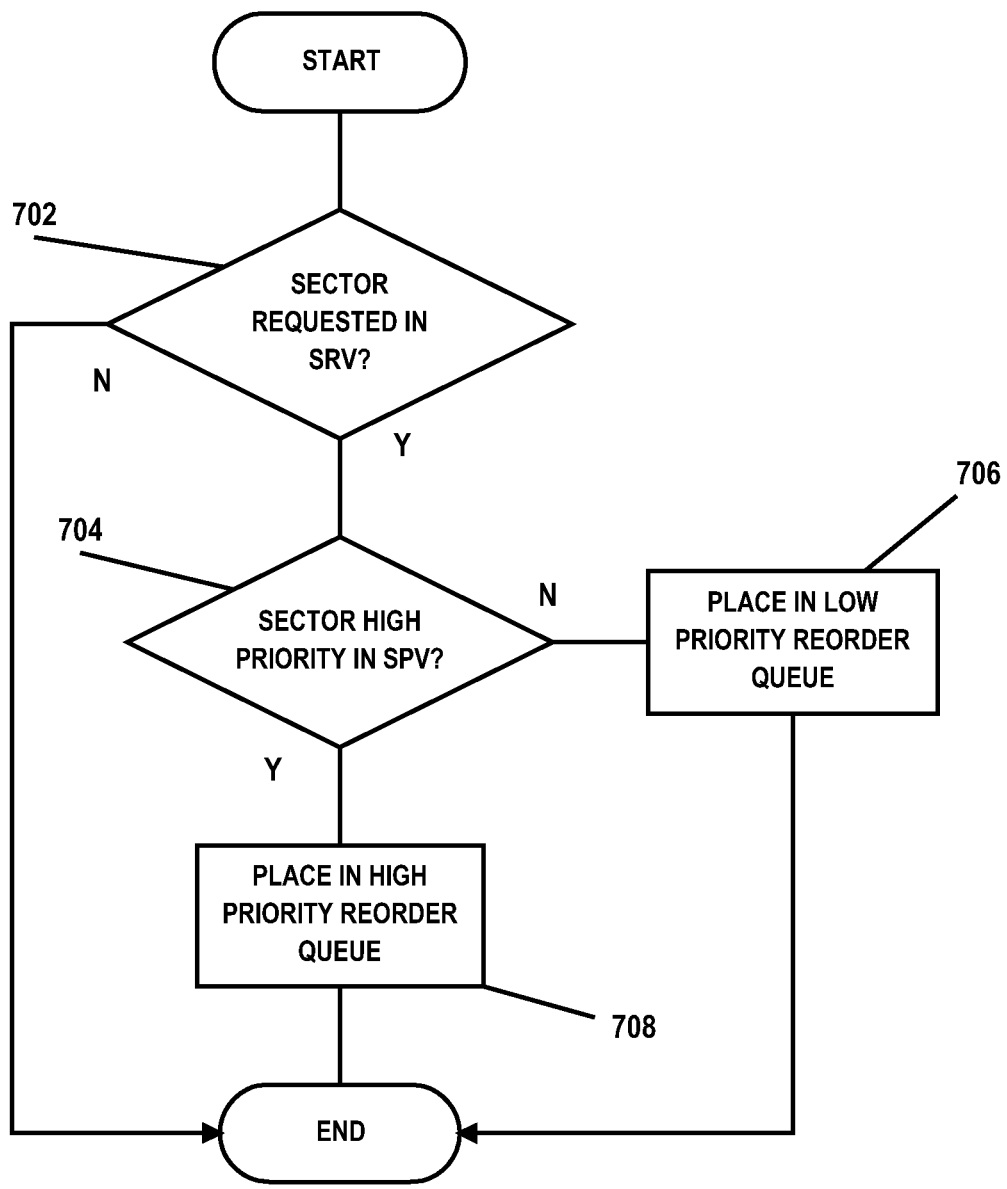
FIG. 7 is a flow diagram illustrating an embodiment of a method for performance-driven cache line memory access according to the present disclosure.

FIG. 7 is a flow diagram illustrating an embodiment of a method for performance-driven cache line memory access. The method depicted in FIG. 7 may comprise a method performed by memory controller 360 for each sector in a cache line address. The method begins at decisional block 702, where a determination is made whether a sector is requested in a SRV. If so, the method proceeds to decisional block 704, where a determination is made whether the sector address is high priority in a SPV. If so, the method proceeds to block 706, where the request is placed in a high priority reorder queue 510. If the sector is not a high priority in the SPV, the method proceeds to block 708, where the request is placed in a low priority reorder queue 510. As described above, requests placed in a high priority reorder queue 510 in the memory controller 360 are serviced rapidly and the data returned to the bus requestor. Requests placed in a low priority reorder queue 510 are serviced based on whether one or more low priority service conditions are met. When data is obtained from memory 350 and placed in reload buffer 506, a "push" operation is carried out where a request to a bus is made, snooped by a cache element, a cache controller state machine is initiated, and data is then pushed from memory 350 into a cache.

Figure 8:
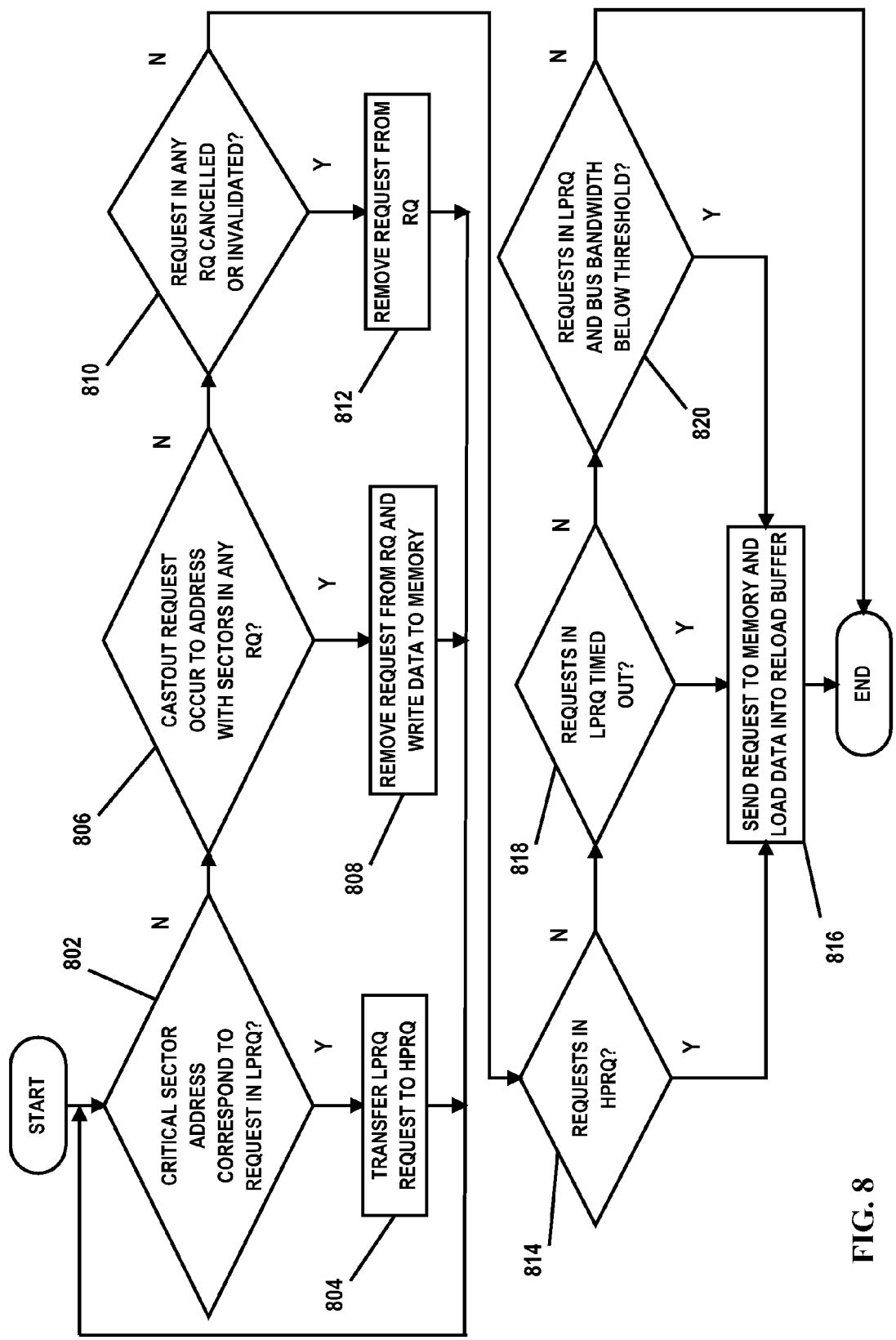
FIG. 8 is a flow diagram illustrating another embodiment of a method for performance-driven cache line memory access according to the present disclosure.

FIG. 8 is a flow diagram illustrating an embodiment of a method for performance-driven cache line memory access. In some embodiments, the process may represent a process and/or algorithm performed every clock cycle by memory controller 360. As used in the FIG. 8 flow diagram, the terms "RQ" refers to a reorder queue 510. Correspondingly, the terms "LPRQ" and "HPRQ" in FIG. 8 refer to low priority and high priority reorder queues 510, respectively. The method begins at decisional block 802, where a determination is made whether a SPV request critical sector address corresponds to a request residing in a low priority reorder queue 510. If so, the method proceeds to block 804, where the request residing in the low priority reorder queue 510 is transferred to a high priority reorder queue 510. If the SPV request critical sector address does not correspond to a request residing in a low priority reorder queue 510 at decisional block 802, the method proceeds to decisional block 806, where a determination is made whether a castout request has occurred to an address with sectors in any reorder queue 510. If so, the method proceeds to block 808, where the request residing in a respective reorder queue 510 is removed and the data written to memory 350.

If it is determined at decisional block 806 that a castout request has not occurred corresponding to an address with sectors in any reorder queue 510, the method proceeds to decisional block 810, where a determination is made whether a request in any reorder queue 510 has been cancelled or invalidated. If so, the method proceeds to block 812, where the corresponding request is removed from the reorder queue 510. If it is determined at decisional block 810 that no request in a reorder queue 5410 has been cancelled or invalidated, the method proceeds to decisional block 814, where a determination is made whether there are any requests in a high priority reorder queue 510. If so, the method proceeds to block 816, where the high priority reorder queue 510 request is sent to memory 350 and the corresponding data obtained and placed into reload data buffer 506. If it is determined at decisional block 814 that there are no requests in a high priority reorder queue 510, the method proceeds to decisional block 818, where a determination is made whether any request in a low priority reorder queue has timed out. If so, the method proceeds to block 816, where a low priority reorder queue 510 request that has timed out is sent to memory 350 and the corresponding data obtained and placed into reload data buffer 506. If it is determined at decisional block 818 that there are no requests in a low priority reorder queue 510 that have timed out, the method proceeds to decisional block 820, where a determination is made whether there are any requests in a low priority reorder queue 510 and whether the bus 342 bandwidth is below threshold 522. If so, the method proceeds to block 816, where a low priority reorder queue 510 request is sent to memory 350 and the corresponding data obtained and placed into reload data buffer 506.

Thus, for example, in the method depicted in FIG. 8, the decisional blocks 802, 806 and 810 may represent decisions based on information received on bus 502 as detected by bus command queue 508, thereby causing requests in reorder queue(s) 510 to be converted to high priority or cancelled/processed. The decisional blocks 814, 818 and 820 may represent decisions occurring for reorder queue(s) 510 for carrying out the actual requests to memory 350 for each cycle.

Thus, embodiments of the present disclosure enable requests to memory for a cache line miss in a cache hierarchy to be divided into cache sublines where a cache subline corresponding to critical or high priority data is serviced rapidly while requests for cache sublines corresponding to non-critical or low priority data are held in a queue until a particular condition is satisfied, thereby utilizing less bandwidth for memory accesses. For example, in some embodiments, the cache subline requests corresponding to low priority data may be held in a queue until the expiration of a timer or until there is available bandwidth on the memory bus. Further, in some embodiments, while the cache subline request is held in a queue, the request may be cancelled or invalidated, thereby obviating the need to utilize memory bandwidth to retrieve the corresponding low priority data.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
receiving, by a memory controller of a data processing system, a request for a cache line;
dividing the request into a plurality of cache subline requests, wherein at least one of the cache subline requests comprises a high priority data request and at least one of the cache subline requests comprises a low priority data request;
placing the low priority data request into a low priority queue;
servicing the high priority data request;
delaying servicing of the low priority data request until a low priority condition has been satisfied; and
responsive to receiving a sector address request corresponding to the low priority data request, transferring the low priority data request to a high priority queue.

2. The method of claim 1, further comprising:
initiating a timer; and
responsive to expiration of the timer, servicing the low priority data request.

3. The method of claim 1, further comprising:
determining bus utilization; and
responsive to the bus utilization being below a threshold, servicing the low priority data request.

4. The method of claim 1, further comprising,
responsive to a processor core cancelling the low priority data request, removing the low priority data request from the queue.

5. The method of claim 1, further comprising,
responsive to receiving a castout request corresponding to an address of the low priority data request, removing the low priority data request from the queue and writing data corresponding to the address to a memory.

6. The method of claim 5, further comprising:
placing the high priority data request into the high priority queue; and
servicing requests from the high priority queue before servicing requests from the low priority queue.

* * * * *